United States Patent [19]

Murakami et al.

[11] Patent Number: 5,486,395
[45] Date of Patent: Jan. 23, 1996

[54] MAGNETO-OPTICAL DISK

[75] Inventors: Yoshiteru Murakami, Nishinomiya; Naoyasu Iketani, Tenri; Akira Takahashi, Nara; Kenji Ohta, Kitakatsuragi, all of Japan

[73] Assignee: Sharp Kabushiki Kaisha, Osaka, Japan

[21] Appl. No.: 984,350

[22] Filed: Dec. 2, 1992

[30] Foreign Application Priority Data

Dec. 5, 1991 [JP] Japan ..................... 3-321932

[51] Int. Cl.$^6$ .................. B32B 3/02; G11B 5/66
[52] U.S. Cl. .................. 428/64.3; 428/694 ML; 428/694 DE; 428/694 RL; 428/694 MM; 428/694 EC; 428/694 GR; 428/694 RE; 428/900; 360/131; 360/135; 365/122; 369/13
[58] Field of Search .................. 428/64, 65, 694, 428/695, 900, 694 ML, 694 DE, 694 RL, 694 MM, 694 EC, 694 GR, 694 RE; 360/131, 135; 365/122; 369/13

[56] References Cited

U.S. PATENT DOCUMENTS

| | | | |
|---|---|---|---|
| 4,559,573 | 12/1985 | Tanaka et al. | 360/131 |
| 4,670,356 | 6/1987 | Sato | 428/693 |
| 4,982,389 | 1/1991 | Nakao et al. | 369/13 |

FOREIGN PATENT DOCUMENTS

| | | |
|---|---|---|
| 0192256 | 8/1986 | European Pat. Off. . |
| 0233034 | 8/1987 | European Pat. Off. . |
| 0258978 | 3/1988 | European Pat. Off. . |
| 0296888 | 12/1988 | European Pat. Off. . |
| 0350010 | 1/1990 | European Pat. Off. . |
| 57-152555 | 9/1982 | Japan . |
| 60-119648 | 6/1985 | Japan . |
| 61-211851 | 9/1986 | Japan . |
| 62-277644 | 12/1987 | Japan . |
| 63-074143 | 4/1988 | Japan . |
| 1107344 | 4/1989 | Japan . |

OTHER PUBLICATIONS

"Super Resolution in Magneto–Optical Disks" (Journal of Japanese Society of Applied Magnetics, vol. 15, No. 5, 1991), M. Kaneko, et al.

"Some Magnetooptical and HF Properties of Magnetic Films" (IEEE GTransactions on Magnetics, vol. MAG–10, No. 4, Dec., 1974, New York, USA).

Co–pending application, U.S. patent application Ser. No. 07/870,630, filed on Apr. 16, 1992 now abandoned.

Primary Examiner—L. Kiliman
Attorney, Agent, or Firm—David G. Conlin; George W. Neuner; Brian L. Michaelis

[57] ABSTRACT

A magneto optical disk comprising: a circular substrate; a recording layer, formed on the substrate, for magneto-optical recording of information; a readout layer, formed between the substrate and the recording layer, for the reproduction of information recorded on the recording layer, wherein the readout layer has a Curie temperature which is higher than the Curie temperature of the recording layer, and exhibits in-plane magnetization at room temperature and a change from in-plane magnetization to perpendicular magnetization when its temperature rises over a certain temperature as a result of the application of a light beam, and wherein the magnetic compensation temperature is set such that it increases from the peripheral edge of the magneto-optical disk toward the center thereof. When the magneto-optical disk is used with a magneto-optical recording and reproducing device using a CAV system, it achieves high-density recording and the reproduction of signals with reduced noise, without causing the light beam control system to be complicated.

11 Claims, 4 Drawing Sheets

MAGNETO-OPTICAL DISK

FIELD OF THE INVENTION

The present invention relates to a magneto-optical disk using a constant angular velocity (CAV) method and the reproduction of information recorded thereon by optical means.

BACKGROUND OF THE INVENTION

The recording density of optical storage devices such as magneto-optical disks depends greatly on the size of a light beam converged as a light spot on a recording medium in recording and reproduction. A recently proposed system enables the reproduction of a bit which is smaller than the spot size of a light beam. In optical recording, the light beam is usually converged to a diffraction limit by a converging lens. This causes the intensity distribution of light to be Gaussian and the distribution of temperature on the recording medium to become substantially Gaussian. Consequently, a portion which has been exposed to light and heated to a temperature above a certain temperature has a size smaller than the spot size of the light beam. If it is possible to reproduce only a portion having a temperature above the certain temperature, the recording density can be significantly increased.

With reference to FIG. 6, the following description discusses the system for reproducing a bit smaller than the spot size of a light beam, recorded on a magneto-optical disk (disclosed in the U.S. patent application Ser. No. 07/870,630 now abandoned).

The magneto-optical disk is composed chiefly of a transparent substrate 25, and a readout layer 26 and a recording layer 27 formed thereon. The Curie temperature for the readout layer 26 is considerably higher than that for the recording layer 27. Another characteristic of the readout layer 26 is that it exhibits in-plane magnetization at room temperature and perpendicular magnetization when its temperature becomes higher than a certain temperature as a result of the application of the light beam.

In reproduction, when the light beam is applied to the readout layer 26, the temperature distribution at a region exposed to the light beam becomes Gaussian. Consequently, only a portion, which corresponds to the central portion of the light beam and is thus smaller than the diameter of the light spot, is heated to a temperature over the certain temperature. With the rise of the temperature, there is a change from in-plane magnetization to perpendicular magnetization in the readout layer 26. At this time, the magnetizing direction in the recording layer 27 is copied to the readout layer 26 by the exchange coupling force between the readout layer 26 and the recording layer 27.

As a result, magneto-optical effect occurs only at the portion which has been heated to above the certain temperature and a change from in-plane magnetization to perpendicular magnetization is observed. And, information recorded on the recording layer 27 is reproduced using reflected light from the portion.

When the light beam moves to reproduce the next recorded bit, the temperature of the previously reproduced portion decreases and the magnetization of the readout layer 26 changes from perpendicular magnetization to in-plane magnetization. Since the portion whose temperature has dropped below the certain temperature no longer exhibits the magneto-optical effect, the information recorded in the portion of the recording layer 27 is masked by the in-plane magnetization of the readout layer 26, preventing reading of the information. It is thus possible to reproduce only a desired bit without having interference between signals from the desired bit and adjacent bits, preventing noise.

As described above, only a portion whose temperature has risen over a certain temperature is reproduced, it is possible to reproduce a recorded bit smaller than the diameter of the light spot, improving the recording density.

With regard to methods of controlling the rotation of a magneto-optical disk in a magneto-optical recording and reproducing device, they are generally classified into two types, namely the CLV (constant linear velocity) method and the CAV (constant angular velocity) method. With the CLV, the disk uses a constant linear velocity of track relative to pickup so the rotational speed is a function of the radius of the track, and varies as the pickup moves across the disk. The CLV is obtained by changing the rotational speed of a motor which rotates a disk. On the other hand, with the CAV method, the motor always rotates at a uniform speed. Consequently, the linear velocity of track relative to the pickup is a function of the radius of the track. Advantage of the CAV over the CLV is that the structure of a motor control system is simplified because the rotational speed of the motor is uniform.

However, with the CAV, a portion to be exposed to the light beam and heated to a temperature over a certain temperature has different sizes in the central area and the peripheral area of the magneto-optical disk. Specifically, since the linear velocity of the disk at the central area is lower compared to that at the peripheral area, when the intensity of the light beam applied to the central area is the same as the intensity of the light beam applied to the peripheral area, the size of a portion heated to a temperature over the certain temperature in the central area becomes larger than that in the peripheral area. Therefore, in the recording medium shown in FIG. 6, the size of a portion on the readout layer 26 where a change from in-plane magnetization to perpendicular magnetization is observed becomes larger toward the center of the disk. As a result of a portion includes not only a desired bit but also adjacent bits, causing noise in reproduction.

To avoid such a problem, the intensity of light beam may be changed as a function of the radius of the disk. However, this method is not practically desirable because a burden of the light beam control system increases.

SUMMARY OF THE INVENTION

It is an object of the present invention to provide a magneto-optical disk achieving high-density recording and the reproduction of signals with reduced noise.

To achieve this object, a magneto-optical disk of the present invention has a circular substrate, a recording layer whereupon information is magneto-optically recorded, and a readout layer from which the information recorded on the recording layer is read out. The recording layer is formed on the substrate, and the readout layer is formed between the substrate and the recording layer. The Curie temperature for the readout layer is higher than the Curie temperature for the recording layer. The readout layer exhibits in-plane magnetization at room temperature. When the temperature of the readout layer rises over a certain temperature as a result of the application of a light beam, there is a change from in-plane magnetization to perpendicular magnetization. The magnetic compensation temperature for the readout layer is determined such that it rises from the peripheral edge of the magneto-optical disk toward the center thereof.

With this arrangement, the linear velocity of the magneto-optical disk becomes lower in the central area and, even when the intensity of the reproduction-use light beam is uniform, the sizes of portions of the readout layer where a change from in-plane magnetization to perpendicular magnetization occurs becomes almost uniform in the central area and the peripheral area. This enables a magneto-optical recording and reproducing device employing the CAV to achieve high-density recording and the reproduction of signals with reduced noise, without causing a light beam control system to be complicated.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view showing the structure of a magneto-optical disk of the present invention and a reproducing operation.

FIG. 2 explains states of magnetization of a readout layer of the magneto-optical disk of FIG. 1.

FIG. 3 is an explanatory view showing a reproducing operation performed at the peripheral area of the magneto-optical disk of FIG. 1.

FIG. 4 is an explanatory view showing a reproducing operation performed at the central area of the magneto-optical disk of FIG. 1.

FIG. 5 is an explanatory view showing the structure of a magneto-optical disk according to alternative embodiment of the present invention.

DESCRIPTION OF THE EMBODIMENTS

The following description discusses one embodiment of the present invention with reference to FIGS. 1 through 5.

Figure 1:
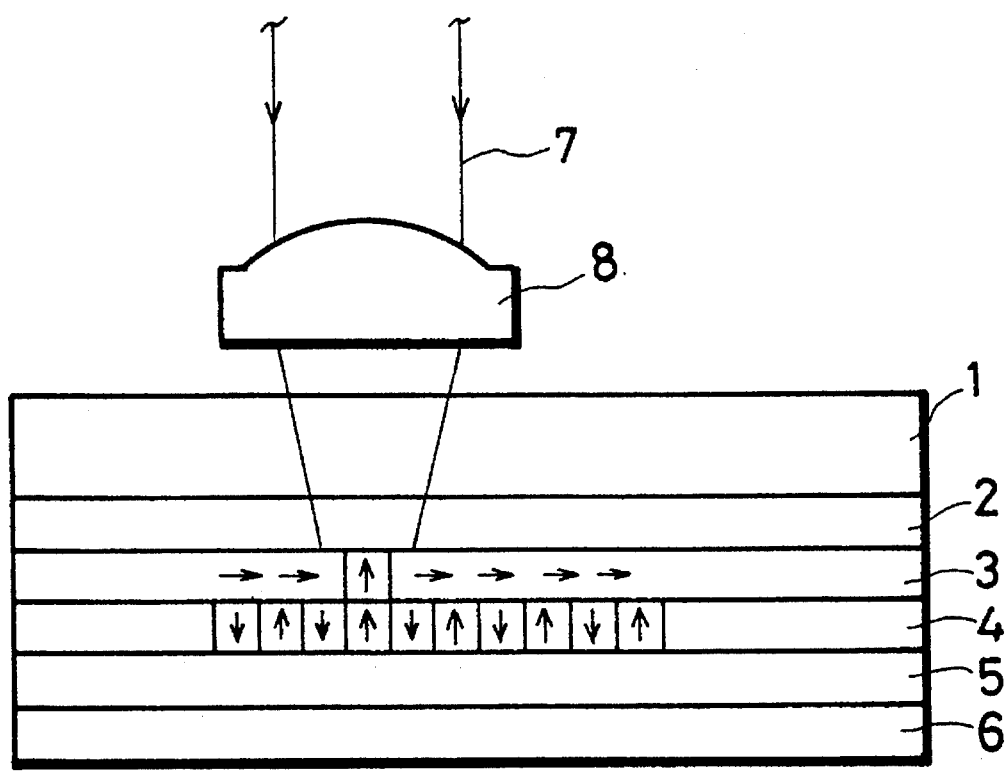
FIGS. 1 through 5 show one embodiment of the present invention.

As illustrated in FIG. 1, a magneto-optical disk of this embodiment is constituted by a substrate 1, a transparent dielectric film 2, a readout layer 3, a recording layer 4, a transparent dielectric film 5, and an overcoat layer 6, laminated in this order.

The recording layer 4 is made from DyFeCo, and has a Curie temperature between 150° C. and 250° C. and a film thickness of 20 nm. The readout layer 3 is formed by a thin film made of an alloy of rare earth elements and transition metals.

The transparent. dielectric film 2 is made of dielectric film of AlN, SiN or AlSiN. And its film thickness is almost equal to a value obtained by dividing a quarter of wavelength of reproduction-use light by a refractive index. If the wavelength of the reproduction-use light is 800 nm for example, the film thickness of the transparent dielectric film 2 is around 80 nm.

The transparent dielectric film 5 is a protective film made from nitride and has a film thickness of 50 nm.

Figure 2:
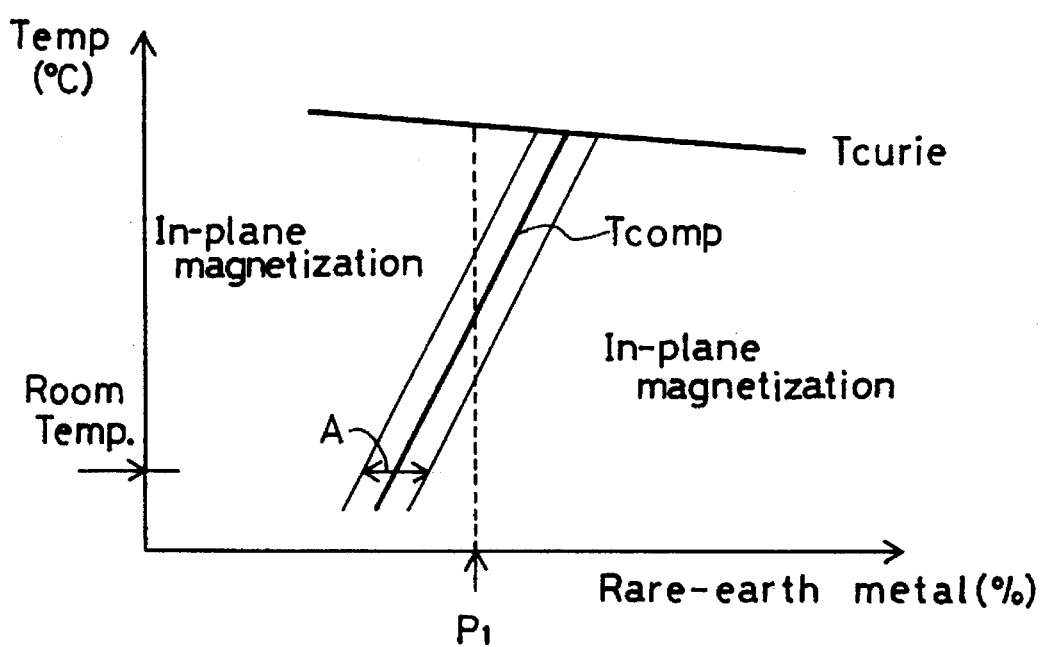

FIG. 2 shows magnetic states of a thin film made of an alloy of rare earth elements and transition metals, GdFeCo, as the readout layer 3. The region where the alloy exhibits perpendicular magnetization is small, namely perpendicular magnetization is only observed within the region in the vicinity of compensating composition (indicated by A in the drawing where the magnetic moment of Gd as the rare earth element and the magnetic moments of FeCo as transition metals sum to zero). $T_{curie}$ and $T_{comp}$ in the drawing represent the Curie temperature and the compensation temperature, respectively.

The temperature properties of the magnetic moments of the rare earth element and the transition metals are different from each other. Namely, at high temperatures the magnetic moments of the transition metals are greater than that of the rare earth element. Therefore, an alloy used for the readout layer 3 has a composition (for example, the composition shown by $P_1$ in FIG. 2) containing an increased amount of rare earth element (Gd) compared with the compensating composition exhibiting perpendicular magnetization at room temperature. At room temperature an alloy with such a composition does not exhibits perpendicular magnetization but in-plane magnetization. When the application of a light beam raises the temperature of the readout layer 3, the magnetic moments of the transition metals rise proportionally, so the magnetic moments of the transition metals and the rare earth element sum to zero, exhibiting perpendicular magnetization.

In consideration of this fact, in this embodiment, the composition of a GdFeCo film used as the readout layer 3 is determined such that the ratio of Gd to FeCo increases from the peripheral edge of the magneto-optical disk toward the center thereof. As the content of Gd as rare earth element in the GdFeCo thin film increases, the magnetic compensation temperature at which the magnetic moment of the rare earth element and the magnetic moments of the transition metals sum to zero shifts to a higher temperature. In other words, a transition temperature at which there is a change between in-plane magnetization and perpendicular magnetization shifts to a higher temperature. Thus, the transition temperature becomes higher from the peripheral edge toward the center of the magneto-optical disk.

For instance, in this embodiment, the film thickness of GdFeCo as the readout layer 3 is 50 nm, the Curie temperature for the readout layer 3 is between 300° C. and 400° C., and a temperature at which a change from in-plane magnetization to perpendicular magnetization occurs on the readout layer 3 is around 70° C. in the peripheral area of the magneto-optical disk.

With this arrangement, as shown in FIG. 1, a reproduction-use light beam 7 is applied to the readout layer 3 through a converging lens 8, the substrate 1 and the dielectric film 2 when reproducing the peripheral area of the disk.

At this time, if recording is made on the recording layer 4 by, for example, magnetizing the recording layer 4 in the direction shown in FIG. 1, only the temperature of a portion of the readout layer 3 corresponding to the central portion of the reproduction-use light beam 7 rises to around 70° C. This is due to the fact that the intensity distribution of light is Gaussian as the reproduction-use light beam 7 is converged into a diffraction limit, and that the temperature distribution of the reproduced portion is also substantially Gaussian.

Figure 3:
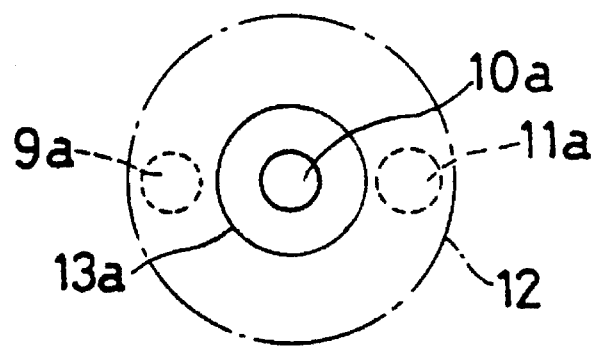

At this time, the diameter of a portion 13a having a temperature above 70° C. is smaller than the diameter of a light spot 12 as shown in FIG. 3 and there is a change from in-plane magnetization to perpendicular magnetization in the portion 13a. More specifically, by the exchange coupling force between the readout layer 3 and the recording layer 4, the magnetization direction of a bit recorded on the recording layer 4 is copied onto the readout layer 3, whereby reproducing a bit 10a.

Meanwhile, in regions outside the portion 13a, the temperatures are below 70° C. and the readout layer 3 retains in-plane magnetization. Therefore, the magnetization information about bits 9a and 11a adjacent to the bit 10a recorded on the recording layer 4 is masked by in-plane magnetization of the readout layer 3, preventing reading of the information.

Thus, only the bit 10a within the portion 13a whose temperature is above 70° C. exhibits magneto-optical effect, and information recoded on the recording layer 4 is reproduced using reflected light from the portion 13a.

Next, the following description discusses a reproducing operation performed at the central area of the disk using the CAV method.

Figure 4:
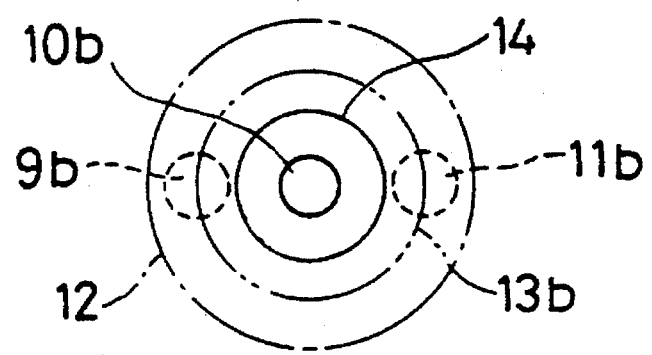

When the intensity of the reproduction-use light beam 7 is the same at the central area and the peripheral area of the disk, in the center area, as shown in FIG. 4, a portion 13b which is larger than the portion 13a has a temperature over 70° C. because the disk moving speed at the central area is slower than that at the peripheral area. Since the composition of the readout layer 3 at the central area is arranged so as to cause the magnetic compensation temperature to be higher than that at the peripheral area, there is a change from in-plane magnetization to perpendicular magnetization in a portion 14 within the portion 13b. Namely, by determining the composition ratio of an alloy of the rare earth element and transition metals forming the readout layer 3 in the central area such that the size of the portion 14 is equal to that of the portion 13a in the peripheral area of a temperature over 70° C., only the bit 10b recorded on the recording layer 4 is copied to the readout layer 3 in the central area.

This arrangement prevents neighboring bits 9b and 11b from being reproduced in the central area by the reproduction-use light beam 7 having the same intensity in the central area and the peripheral area, achieving satisfactory reproduction.

Whilst GdFeCo is used for the readout layer 3 in this embodiment, it is also possible to use GdCo.

The temperature at which there is a change from in-plane magnetization to perpendicular magnetization on the readout layer 3 is set between 70° C. and 150° C. If the temperature exceeds 150° C., there is a possibility that the information recorded on the recording layer 4 is erased during reproduction.

Figure 5:
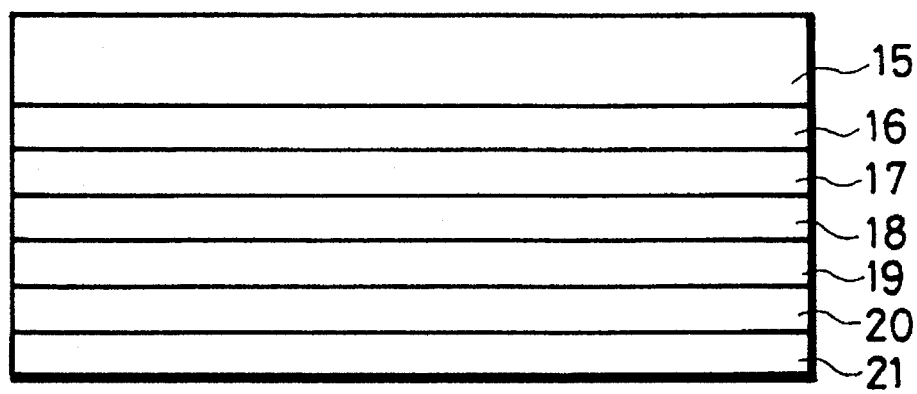
Figure 6:
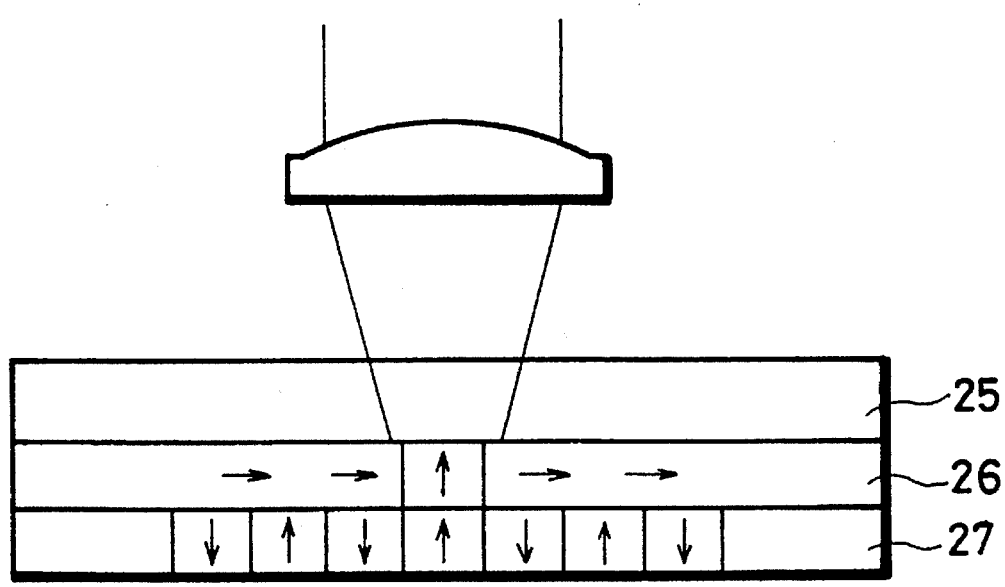
FIG. 6 is an explanatory view showing a reproducing operation with respect to a conventional magneto-optical disk.

With reference to FIG. 5 the following description discusses a magneto-optical disk which has a reflecting film in addition to the disk structure of the above-mentioned embodiment.

As illustrated in FIG. 5, a magneto-optical disk of this embodiment has a substrate 15, a transparent dielectric film 16, a readout layer 17, a recording layer 18, a transparent dielectric film 19, a reflecting film 20, and an overcoat layer 21, laminated in this order. The properties of the readout layer 17 are that it exhibits in-plane magnetization at room temperature like the previous embodiment and that there is a change from in-plane magnetization to perpendicular magnetization when its temperature rises over a certain temperature as a result of the application of a light beam. The composition of the readout layer 17 is varied such that the magnetic compensation temperature increases from the peripheral edge of the magneto-optical disk toward the center thereof.

Except for the inclusion of the reflecting film 20 to enhance the magneto-optical effect, the substrate 15, transparent dielectric film 16, readout layer 17, recording layer 18, transparent dielectric film 19, and the overcoat layer 21 in this embodiment have the same structures and properties as those in the above-mentioned embodiment. Therefore, detailed explanation thereof is omitted here. In this embodiment, the film thickness of the transparent dielectric film 16 is 80 nm. Each of the readout layer 17 and the recording layer 18 has a film thickness of 15 nm. The film thicknesses of transparent dielectric film 19 and the reflecting film 20 are 30 nm and 50 nm, respectively.

With this arrangement, a reproduction-use light beam (not shown) is applied to the readout layer 17 through a converging lens (not shown), the substrate 15 and the dielectric film 16. Rays of the reproduction-use light beam having passed through the recording layer 18 and the transparent dielectric film 19 are reflected by the reflecting film 20. Only the temperature of a portion of the readout layer 17 which has exposed to the central portion of the reproduction-use light beam rises over a certain temperature, whereby causing a change from in-plane magnetization to perpendicular magnetization. The composition of the readout layer 17 made of an alloy of rare earth element and transition metals is determined such that in the central area the change from in-plane magnetization to perpendicular magnetization is observed at temperatures higher than those in the peripheral area. Therefore, when reproduction-use light beam has the same intensity in the central area and the peripheral area of the disk using the CAV method, information is reproduced from a bit without noise of neighboring bits.

In addition to the effects of the above-mentioned embodiment, the reflective film 20 of this embodiment enhances the magneto-optical effect and causes the magnetic Kerr rotation angle to be larger. Therefore, the quality of the reproduced signal is improved.

With the method of producing the readout layer by varying its composition along a radial direction of the magneto-optical disk of the above-mentioned embodiments, if GdFeCo is formed into the readout layer by sputtering with a sputtering device having, for example, a stationary substrate facing a target, the target is made from an alloy of Gd, Fe, and Co while varying its composition along a radial direction of the disk and used as a commonly used circular target. In the case of using a so-called composite target formed by disposing Gd chips in the shape of several mm cubic on a circular base target made from Fe or FeCo, the position and the number of Gd chips to be disposed are changed so as to have desired compositions along the radial direction.

As described above, since the effect of the present invention is demonstrated by varying only the composition of the readout layer along a radial direction of the magneto-optical disk, it is obvious that the effect of the present invention is also observed in different types of magneto-optical disks having a readout layer.

For instance, the present invention is applicable to a magneto-optical disk having a readout layer, a recording layer, a subsidiary magnetic layer enabling light-modulation overwriting, a switching layer, an initializing magnetic field layer, and to a magneto-optical disk having a readout layer which also functions as a recording layer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto optical disk comprising:

a circular substrate;

a recording layer, formed on said substrate, for a recording of information;

a readout layer, formed between said substrate and said recording layer, for a reproduction of information recorded on said recording layer, wherein said readout layer has a Curie temperature which is higher than a Curie temperature of said recording layer, exhibits in-plane magnetization at room temperature and a change from in-plane magnetization to perpendicular magnetization when its temperature rises as a result of an application of a light beam, and wherein a first temperature at which a change occurs from in-plane magnetization to perpendicular magnetization is set such that it increases from a peripheral edge of said magneto-optical disk toward a center thereof.

2. The magneto-optical disk according to claim 1, wherein a composition of said readout layer is varied along a radial direction of said magneto-optical disk such that the first temperature increases from the peripheral edge of said magneto-optical disk toward the center thereof.

3. A magneto optical disk as set forth in claim 1, wherein said first temperature is approximately the magnetic compensation temperature of the readout layer.

4. The magneto-optical disk according to claim 2, wherein the Curie temperature of said recording layer is between 150° C. and 250° C. the Curie temperature of said readout layer is between 300° C. and 400° C., and the first temperature at which there is a change from in-plane magnetization to perpendicular magnetization on said readout layer is set between 70° C. and 150° C.

5. The magneto-optical disk according to claim 2, wherein said readout layer is formed by a thin film made of an alloy of a rare earth element and a transition metal, a content of the rare earth element components increases from the peripheral edge of said magneto-optical disk toward the center thereof.

6. The magneto-optical disk according to claim 3, wherein the Curie temperature of said recording layer is between 150° C. and 250° C., the Curie temperature of said readout layer is between 300° C. and 400° C., and the first temperature at which there is a change from in-plane magnetization to perpendicular magnetization on said readout layer is set between 70° C. and 150° C.

7. The magneto-optical disk according to claim 3, wherein said readout layer is formed by a thin film made of an alloy of a rare earth element and a transition metal, a content of the rare earth element components increases from the peripheral edge of said magneto-optical disk toward the center thereof.

8. The magneto-optical disk according to claim 5 further comprising:

a first transparent dielectric film between said substrate and said readout layer; and a second transparent dielectric film formed over said recording layer.

9. The magnetic disk according to claim 7 further comprising:

a first transparent dielectric film between said substrate and said readout layer; and a second transparent dielectric film formed over said recording layer.

10. The magneto-optical disk according to claim 8 further comprising a reflecting film formed over said second transparent dielectric film.

11. The magneto-optical disk according to claim 9 further comprising a reflecting film formed over said second transparent dielectric film.

* * * * *